United States Patent
Rottschäfer et al.

(10) Patent No.: US 7,673,151 B2
(45) Date of Patent: Mar. 2, 2010

(54) PROCESSOR FOR ENCRYPTING AND/OR DECRYPTING DATA AND METHOD OF ENCRYPTING AND/OR DECRYPTING DATA USING SUCH A PROCESSOR

(75) Inventors: Thomas Rottschäfer, Hamburg (DE); Mathias Wagner, Alvesen-Rosengarten (DE)

(73) Assignee: NXP B.V., Eindhoven (NL)

( * ) Notice: Subject to any disclaimer, the term of this patent is extended or adjusted under 35 U.S.C. 154(b) by 681 days.

(21) Appl. No.: 10/559,917

(22) PCT Filed: Jun. 7, 2004

(86) PCT No.: PCT/IB2004/050850

§ 371 (c)(1),
(2), (4) Date: Dec. 7, 2005

(87) PCT Pub. No.: WO2004/112308

PCT Pub. Date: Dec. 23, 2004

(65) Prior Publication Data

US 2006/0159258 A1    Jul. 20, 2006

(30) Foreign Application Priority Data

Jun. 12, 2003 (EP) .................................. 03101719

(51) Int. Cl.
*G06F 11/30* (2006.01)
*G06F 12/14* (2006.01)
*H04K 1/00* (2006.01)
*H04L 9/00* (2006.01)

(52) U.S. Cl. .................... 713/189; 713/194; 380/29
(58) Field of Classification Search ........... 380/28–29, 380/35–37, 42, 44–45, 47, 255; 713/189
See application file for complete search history.

(56) References Cited

U.S. PATENT DOCUMENTS

| | | | | | |
|---|---|---|---|---|---|
| 5,255,376 | A | * | 10/1993 | Frank | 710/105 |
| 5,261,003 | A | * | 11/1993 | Matsui | 380/264 |
| 5,919,251 | A | * | 7/1999 | Tran | 710/52 |
| 2002/0021802 | A1 | * | 2/2002 | Muratani et al. | 380/29 |
| 2003/0202658 | A1 | * | 10/2003 | Verbauwhede | 380/43 |

FOREIGN PATENT DOCUMENTS

EP 0 518 315 12/1992

OTHER PUBLICATIONS

Hennessy, J. L. and D. A. Patterson, Computer Architecture: A Quantitative Approach, 1996, Morgan Kaufmann, 2nd Ed., p. 499.*
John L. Hennessy and David A. Patterson, Computer Architecture: A Quantitative Approach, 2nd ed., Morgan Kaufmann, Jan. 1996.*

* cited by examiner

*Primary Examiner*—Nasser Moazzami
*Assistant Examiner*—Trong Nguyen

(57) ABSTRACT

A control device is connected to at least one encryption/decryption device via at least one communication device. The control device is connected to a round key generator via at least one further communication device. The control device has at least one external key input, the at least one encryption/decryption device has at least one external data input and at least one external data output, and the at least one encryption/decryption device and the round key generator are decoupled from one another.

17 Claims, 1 Drawing Sheet

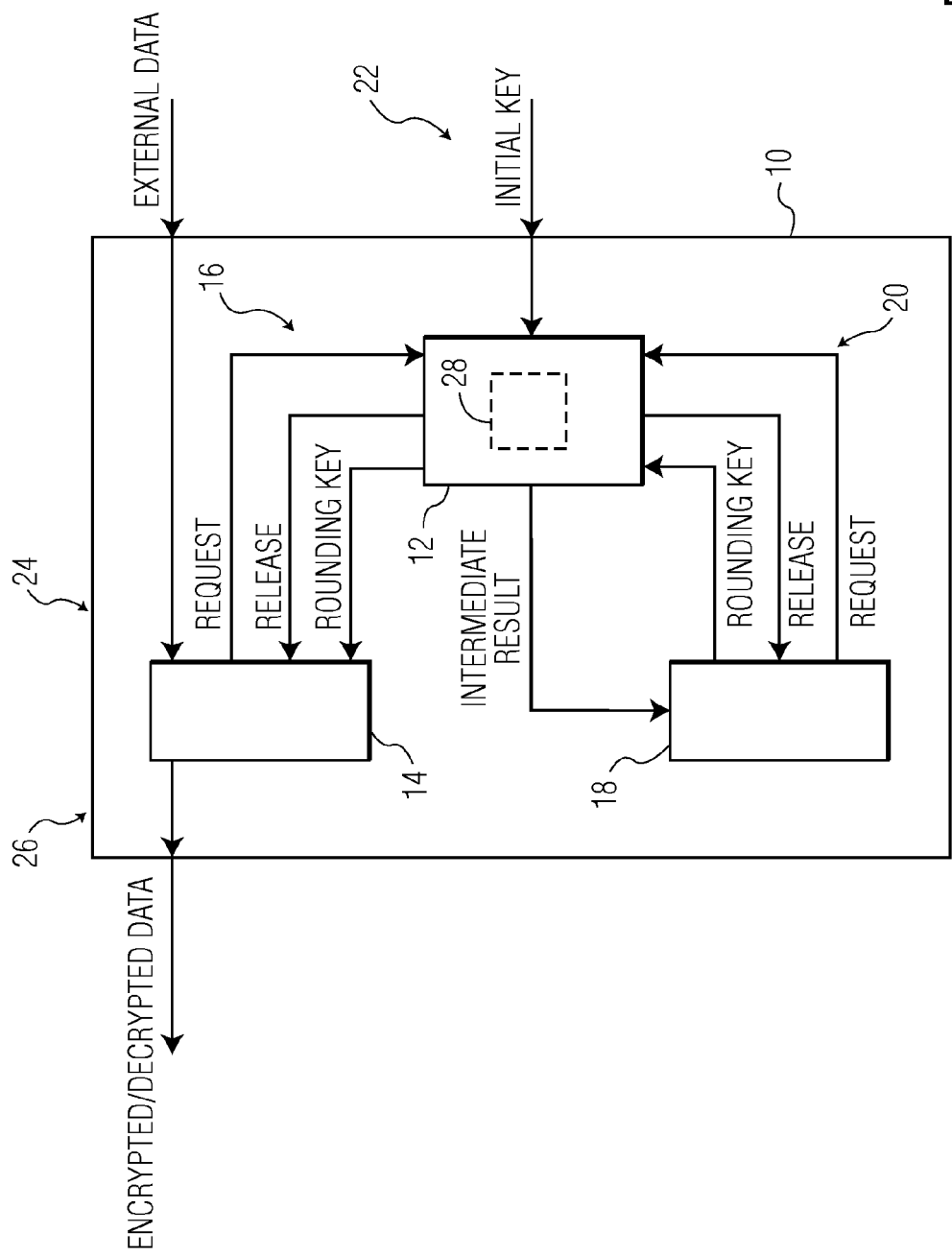

PROCESSOR FOR ENCRYPTING AND/OR DECRYPTING DATA AND METHOD OF ENCRYPTING AND/OR DECRYPTING DATA USING SUCH A PROCESSOR

The invention relates to a processor for encrypting and/or decrypting data and to a method of encrypting and/or decrypting data using such a processor having the features mentioned in the preambles of claims 1 and 11.

The Rijndael algorithm, which has been selected by the American National Institute of Standards and Technology (NIST) as the Advanced Encryption Standard (AES), consists of two main blocks: the key scheduling block for calculating the key for the individual encryption rounding operations and the actual encryption and decryption block. Up to now there have been two types of AES coprocessor. Either all rounding keys are calculated prior to encryption/decryption (precalculation), whereby large storage areas are required to store the rounding keys, or else the rounding keys are calculated prior to each encryption rounding operation, as a result of which it is known at which point in time a rounding key is calculated and hence an attack on key generation is easier. Since a recursive algorithm is used in key generation, a relatively large storage area is required in this case too.

It is an object of the invention to provide a processor for encrypting and/or decrypting data and a method of encrypting and/or decrypting data using such a processor which are characterized by a lower storage requirement and greater safety against attacks on the rounding key generation than previously known. In particular, it is an object of the invention to provide an AES coprocessor and a method of AES calculation having said properties.

This object is achieved according to the invention by a processor having the features mentioned in claim 1 and a method of encrypting and/or decrypting data having the features mentioned in claim 11. The processor according to the invention is characterized in that a control device is connected to at least one encryption/decryption means via at least one communication means, the control device is connected to at least one rounding key generation means via at least one further communication means, the control device has at least one external key input, the at least one encryption/decryption means has at least one external data input and at least one external data output, and the at least one encryption/decryption means and the at least one rounding key generation means are decoupled from one another. There is thus neither a direct data path between the at least one encryption/decryption means and the at least one rounding key generation means nor a direct connection of the at least one rounding key generation means to the outside world. Access to the at least one rounding key generation means can thus take place only by means of sequence control or the at least one encryption/decryption means. Increased safety against attacks on rounding key generation combined with a small necessary storage area, which is used only to accommodate data that are temporarily needed for the recursive key calculation, are thereby achieved.

In one preferred refinement of the invention it is provided that the at least one communication means comprises at least one request line, at least one release line and at least one data line and/or the at least one further communication means comprises at least one further request line, at least one further release line and at least one further data line. Particularly favorable properties are thereby advantageously achieved, as a result of which the processor according to the invention is suitable for implementing a wide range of control algorithms in a simple manner.

Furthermore, in one preferred refinement of the invention it is provided that the at least one request line, the at least one release line and the at least one data line and/or the at least one farther request line, the at least one further release line and the at least one further data line at least partially use the same line physics. In this way, a minimization of the required installation space and thus increased economy are advantageously achieved.

Moreover, in one preferred refinement of the invention it is provided that the control device comprises at least one storage means in which at least one rounding key generated by the at least one rounding key generation means can be temporarily stored. The necessary storage area is thus small and depends only on the depth of recursion. In this way, the required installation space is minimized, resulting in increased economy.

Furthermore, in one preferred refinement of the invention it is provided that at least one rotating pointer is provided for access to the at least one storage means. Storage areas that have already been read can thus be released in a simple manner for writing with new rounding keys, since by virtue of the pointer no areas which have not yet been read are written to and only areas which have been written to with valid keywords are read. As a result, the required storage area can be kept small.

Moreover, in one preferred refinement of the invention it is provided that at least one handshake protocol is provided for communication of the control device with the at least one encryption/decryption means and/or with the at least one rounding key generation means. A temporary inactivity of encryption/decryption means and/or rounding key generation means is thereby obtained, as a result of which attacks on key generation are made more difficult.

Furthermore, in one preferred refinement of the invention it is provided that the modes of operation of the control device, of the at least one encryption/decryption means and of the at least one rounding key generation means are asynchronous with respect to one another. As a result, attacks on key generation are made more difficult.

In one preferred refinement of the invention it is moreover provided that at least one dummy calculation and/or at least part of at least one previous rounding key calculation can be carried out by means of the at least one rounding key generation means during at least one inactive phase. This gives additional protection against attacks on key generation.

In addition, in one preferred refinement of the invention it is provided that the time between calculation and use of the at least one rounding key is variable. Attacks on the calculation of the rounding key are thereby advantageously made more difficult.

Preferably the processor according to the invention for encrypting and/or decrypting data is embodied so as to be an AES coprocessor and used as such.

The method of encrypting and/or decrypting data according to the invention using a processor according to the invention is characterized in that a) at least one initial key is read into a control device, b) external data are read into at least one encryption/decryption means, c) at least one data word needed to calculate at least one rounding key is read from at least one storage means of the control device and transferred to at least one rounding key generation means, d) at least one rounding key is calculated recursively on the basis of the at least one data word by means of the at least one rounding key generation means, transferred to the control device and stored in the at least one storage means, e) the at least one rounding key is transferred to the at least one encryption/decryption means, f) the external data are encrypted or decrypted by means of the at least one encryption/decryption means using the at least one rounding key and the encrypted or decrypted data are made available at least one external data output, and g) steps b) to f) are repeated as often as necessary to encrypt or decrypt a set of external data.

There is thus neither a direct data path between the at least one encryption/decryption means and the at least one rounding key generation means nor a direct connection of the at least one rounding key generation means to the outside world. Access to the at least one rounding key generation means thus takes place only by means of sequence control or the at least one encryption/decryption means. Increased safety against attacks on rounding key generation combined with a small necessary storage area, which is used only to accommodate data that are temporarily needed for the recursive key calculation, are thereby achieved.

Within the context of the method according to the invention it is preferably provided that the communication of the control device with the at least one encryption/decryption means and/or the at least one rounding key generation means takes place by means of at least one handshake protocol. A temporary inactivity of encryption/decryption means and/or rounding key generation means is thereby obtained, as a result of which attacks on key generation are made more difficult.

Furthermore, within the context of the method according to the invention it is preferably provided that the communication of the control device with the at least one encryption/decryption means and the at least one rounding key generation means takes place asynchronously. As a result, attacks on key generation are made more difficult.

Moreover, within the context of the method according to the invention it is preferably provided that access to the at least one storage means takes place by means of at least one rotating pointer. Storage areas that have already been read can thus be released in a simple manner for writing with new rounding keys, since by virtue of the pointer no areas which have not yet been read are written to and only areas which have been written to with valid keywords are read. As a result, the required storage area can be kept small.

Furthermore, within the context of the method according to the invention it is preferably provided that at least one dummy calculation and/or at least part of at least one previous rounding key calculation is carried out by means of the at least one rounding key generation means during at least one inactive phase. This gives additional protection against attacks on key generation.

In addition, within the context of the method according to the invention it is preferably provided that the time between calculation and use of the at least one rounding key is variable. Attacks on the calculation of the rounding key are thereby advantageously made more difficult.

Finally, the method of encrypting and/or decrypting data according to the invention can preferably be embodied and used as a method of AES calculation using a processor according to the invention which is embodied so as to be an AES coprocessor and used as such.

Further preferred refinements of the invention emerge from the other features mentioned in the dependent claims.

The invention will be further described with reference to an example of embodiment shown in the drawing to which, however, the invention is not restricted.

The FIGURE shows an AES coprocessor.

The FIGURE shows a block diagram of one embodiment of an AES coprocessor 10 according to the invention. The AES coprocessor 10 comprises a control device 12, an encryption/decryption means 14 and a rounding key generation means 18, wherein the control device 12 is connected to the encryption/decryption means 14 via a communication means 16 and to the rounding key generation means 18 via a further communication means 20. The communication means 16 and the further communication means 20 each have a request line and a release line and also a data line for transmitting the rounding keys, the rounding key generation means 18 being connected to the control device 12 via an additional data line for transmitting intermediate results for the recursive calculation of the rounding keys. The control device 12 comprises a storage means 28 for temporarily accommodating an initial key, introduced into the control device via an external key input 22, rounding keys and also intermediate results of the recursion. No rounding keys can be stored in the encryption/decryption means 14 or the rounding key generation means 18. The blocks—encryption/decryption means 14, control device 12 and rounding key generation means 18—which operate asynchronously with respect to one another, communicate by means of a handshake protocol, there being no direct data connection between encryption/decryption means 14 and rounding key generation means 18. At the start of an AES calculation, all three blocks are started in parallel. External data are read into the encryption/decryption means 14 via an external data input 24, and the initial key is read into the control device 12 via an external key input 22. The encryption/decryption means 14 and the rounding key generation means 18 both transmit a request to the control device 12, indicating that input data are required, and wait until this request is met. In respect of the first encryption/decryption rounding operation, the rounding key generation means 18 has priority, that is to say that the data words needed for the recursive algorithm are read from the storage means 28. The priority may be changed for the further rounding operations. Once a keyword has been calculated, the request to write this data word to the storage means 28 is transmitted to the control device 12. The rounding key generation means 18 waits until this request has been met. The actual rounding key is then transmitted to the encryption/decryption means 14, and the external data are encrypted or decrypted in the encryption/decryption means 14 and made available at an external data output 26. In order to keep the required storage area small and make a saving in terms of silicon area, the method is carried out with rotating pointers which release areas that have already been read in order that further rounding keys may be written to them. By virtue of the means according to the invention, a lower storage requirement and greater safety against attacks on rounding key generation than previously known are achieved.

LIST OF REFERENCES

10 AES coprocessor
12 control device
14 encryption/decryption means
16 communication means
18 rounding key generation means
20 further communication means
22 external key input
24 external data input
26 external data output
28 storage means

The invention claimed is:

1. A processor that performs an encryption/decryption operation, the processor comprising:
   a control device that receives at least one initial key, the control device comprising:
      a memory that temporarily stores the at least one initial key, and
      at least one external key input that receives the at least one initial key from a source;
   a round key generator connected to the control device via at least one communication device, wherein the round key generator receives the at least one initial key from the control device to calculate at least one round key and transfers the at least one round key to the memory of the control device;
   at least one encryption/decryption device comprising:
      at least one external data input that receives external data,
      an input that receives the at least one round key from the memory of the control device, and
      at least one external data output that outputs the external data encrypted or decrypted with the at least one round key by the at least one encryption/decryption device, wherein the at least one encryption/decryption device and the round key generator communicate solely via the control device, and the control device transmits intermediate results to the round key generator to perform recursive calculation of the at least one round key;
   a first request line that sends requests from the at least one encryption/decryption device to the control device; and
   a second request line that sends requests from the round key generator to the control device, wherein the at least one encryption/decryption device and the round key generator both transmit requests on the respective first and second request lines to start the encryption/decryption operation after both requests are met, wherein the encryption/decryption operation is repeated as often as necessary, except for receiving the at least one initial key by the control device, to encrypt or decrypt a set of external data.

2. The processor of claim 1, wherein the at least one communication device further comprises:
   first and second release lines; and
   first and second data lines.

3. The processor of claim 2, wherein the first and second request lines, the first and second release lines, and the second data lines at least partially use a single physical path.

4. The processor of claim 1, wherein the at least one round key is temporarily stored in the memory of the control device.

5. The processor of claim 1, wherein the at least one round key is accessed using a rotating pointer.

6. The processor of claim 1, wherein the communication between the control device and the at least one encryption/decryption device and between the control device and the round key generator is accomplished using at least one handshake protocol.

7. The processor of claim 1, wherein the operation of the of the control device, of the at least one encryption/decryption device, and of the round key generator are asynchronous with respect to one another.

8. The processor of claim 1, wherein the round key generator performs a dummy operation.

9. The processor of claim 1, wherein a time between the calculating of the at least one round key by the round key generator and the processing of the external data using the at least one round key is variable.

10. The processor of claim 1, wherein the processor is an Advanced Encryption Standard (AES) coprocessor.

11. A method of performing an encryption/decryption operation using a processor, the method comprising:
   sending a first request on a first request line from at least one encryption/decryption device to a control device and a second request on a second request line from a round key generator to the control device to start the encryption/decryption operation after both requests are met, wherein the at least one encryption/decryption device and the round key generator communicate solely via the control device;
   reading at least one initial key into the control device, wherein the at least one initial key is obtained from a source other than the round key generator;
   reading external data into the at least one encryption/decryption device;
   reading at least one data word needed to calculate at least one round key from at least one storage device of the control device;
   transferring the at least one data word to the round key generator;
   calculating at least one round key recursively on the basis of the at least one data word by using the round key generator;
   transferring the at least one round key to the control device;
   storing the at least one round key in the at least one storage device;
   transferring the at least one round key from the at least one storage device to the at least one encryption/decryption device;
   encrypting or decrypting the external data by using the at least one encryption/decryption device, using the at least one round key, and the encrypted or decrypted external data are made available to at least one external data output; and
   repeating the method as often as necessary, except for reading the at least one initial key into the control device, to encrypt or decrypt a set of external data,
   wherein the control device transmits intermediate results to the round key generator to perform recursive calculation of the at least one round key.

12. The method of claim 11, wherein communication between the control device and the at least one encryption/decryption device, and between the control device and the round key generator is accomplished using at least one handshake protocol.

13. The method of claim 11, wherein the operation of the control device, of the at least one encryption/decryption device, and of the round key generator are asynchronous with respect to one another.

14. The method of claim 11, wherein the at least one round key is accessed using a rotating pointer.

15. The method of claim 11, further comprising:
   performing a dummy operation using the round key generator.

16. The method of claim 11, wherein a time between the calculating of the at least one round key by the round key generator and the processing of the external data using the at least one round key is variable.

17. The method of claim 11, wherein the processor is an Advanced Encryption Standard (AES) coprocessor.

* * * * *